T. Y. VANCLEAVE.
Apparatus for Detaching Horses from Vehicles.
No. 135,177. Patented Jan. 21, 1873.
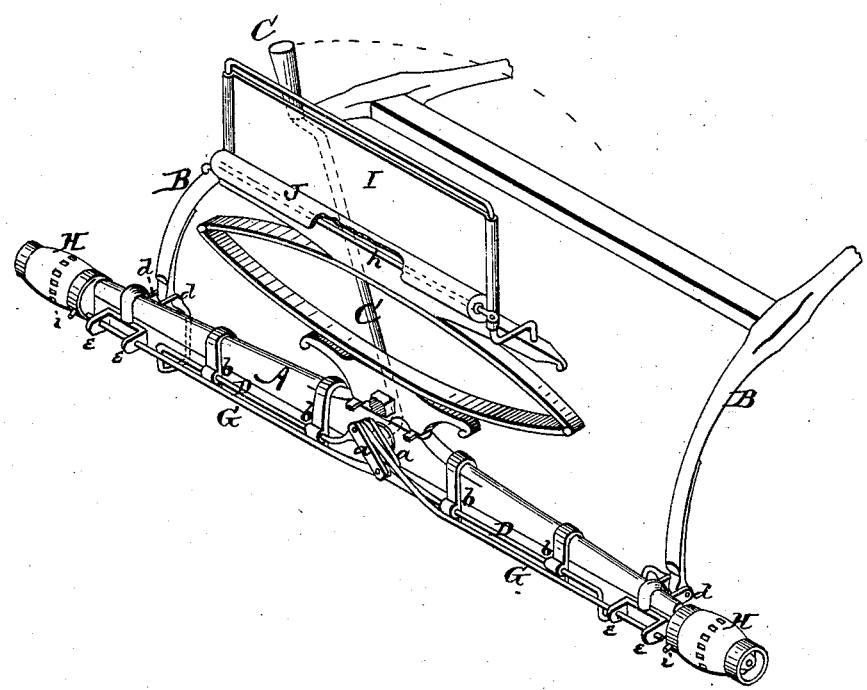
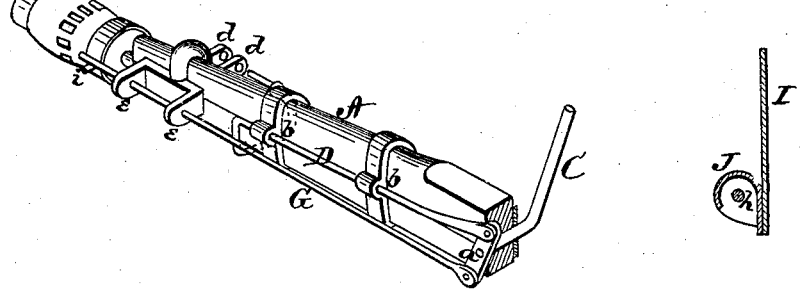
Witness:
Henry N. Miller
C. L. Evert
Inventor.
Thomas Y. Vancleave
per
Alexander T Mason
Attorneys.

UNITED STATES PATENT OFFICE.

THOMAS Y. VANCLEAVE, OF CORNERSVILLE, TENNESSEE.

IMPROVEMENT IN APPARATUS FOR DETACHING HORSES FROM VEHICLES.

Specification forming part of Letters Patent No. 135,177, dated January 21, 1873.

*To all whom it may concern:*

Be it known that I, THOMAS Y. VANCLEAVE, of Cornersville, in the county of Marshall and in the State of Tennessee, have invented certain new and useful Improvements in Vehicles; and do hereby declare that the following is a full, clear, and exact description thereof, reference being had to the accompanying drawing and to the letters of reference marked thereon making a part of this specification.

The nature of my invention consists, first, in a device for attaching and detaching shafts or poles; and, second, in an apron-roller and apron-cover attached to the dash, as will be hereinafter more fully set forth.

In order to enable others skilled in the art to which my invention appertains to make and use the same, I will now proceed to describe its construction and operation, referring to the annexed drawing, in which—

Figure 1 is a perspective view of so much of a vehicle as will fully show my invention, and Fig. 2 is an enlarged perspective view of a part of the same.

A represents the front axle of a vehicle, and B B are the shafts. C is a lever, which extends down in front of the dash, and its lower end, being bent at right angles toward the rear, passes through the center of the axle, and on the rear side of the axle the end of said lever is attached to two short levers, $a$ $a$. Between the ends of these short levers $a$ $a$ are attached two sliding rods, D D, which pass in opposite directions along the rear side of the axle through guide-loops $b$ $b$. The outer end of each rod D is bent down under the axle A and up in front of the axle. It is then bent outward and passes through ears $d$ $d$, between which the end of the shaft B is inserted, the end of the rod D acting instead of a bolt to hold the shaft between the ears. By turning the lever C the sliding rods D D are drawn out of the ears $d$ $d$, loosening the shafts from the vehicle; or, in place of shafts, a pole may be attached and detached in the same manner. At the ends of the short levers $a$ $a$ are also pivoted two other sliding rods, G G, which pass out through guide-loops $e$, and are thrown outward at the same time as the rods D D are thrown inward, and the ends of the rods G G catch on lugs or projections $i$ on the sides of the hubs H H, thereby locking the front wheels. I represents the metal dash, at the lower edge of which is located the apron-roller $h$, and this roller is inclosed by a cover, J. The apron is fastened to the roller $h$ and rolled around up under the apron-cover J, which protects the apron from the dust, and the apron can be easily drawn out or rolled up at will.

I am aware that various devices have been employed for detaching the horse from the shafts; hence I make no broad claim for such as my invention.

Having thus fully described my invention, what I claim as new, and desire to secure by Letters Patent, is—

The combination, with the axle A, of the angular lever C, arms $a$ $a$, rods D D and G G, loops $b$ $b$, ears $d$ $d$, shaft-clips $e$ $e$, and the hubs H H with stops $i$ $i$, all constructed and operating substantially as set forth.

In testimony that I claim the foregoing I have hereunto set my hand this 18th day of November, 1872.

THOMAS Y. VANCLEAVE.

Witnesses:
J. A. HARRIS,
J. M. HAYNES.